May 19, 1931.  F. H. ROYCE  1,805,924
HYDRAULIC SHOCK ABSORBER
Filed March 11, 1927   2 Sheets-Sheet 1

Inventor
Frederick H. Royce
By Mason Fenwick & Lawrence
Attorneys

May 19, 1931.   F. H. ROYCE   1,805,924
HYDRAULIC SHOCK ABSORBER
Filed March 11, 1927   2 Sheets-Sheet 2
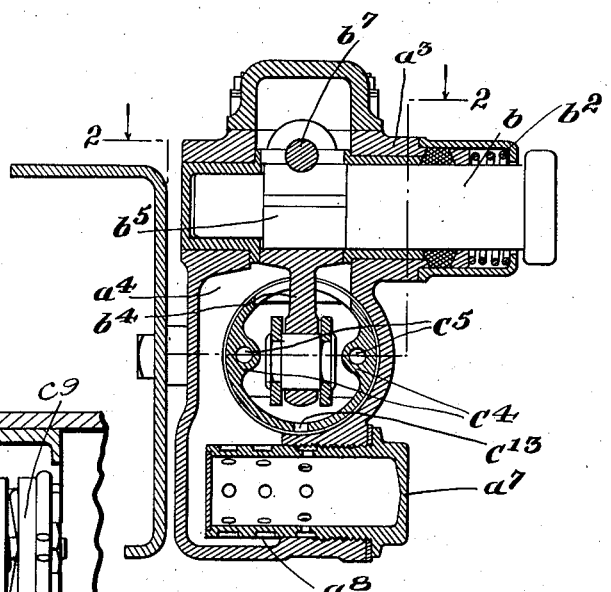
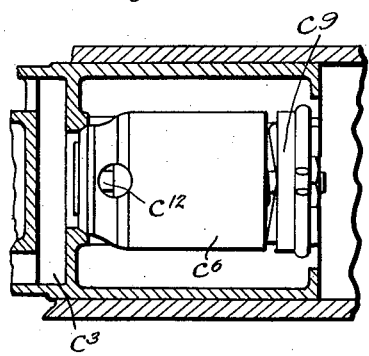
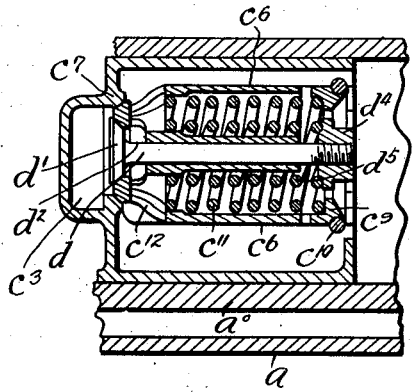
Inventor
Frederick H. Royce
By Mason Fenwick & Lawrence
Attorneys Patented May 19, 1931

1,805,924

UNITED STATES PATENT OFFICE

FREDERICK HENRY ROYCE, OF WEST WITTERING, NEAR CHICHESTER, ENGLAND, ASSIGNOR TO ROLLS ROYCE LIMITED, OF DERBY, ENGLAND

HYDRAULIC SHOCK ABSORBER

Application filed March 11, 1927, Serial No. 174,619, and in Great Britain March 31, 1926.

This invention has reference to hydraulic shock absorbers in which a piston in a closed cylinder is moved axially by the "shocked" member, there is a liquid compression chamber at each side of the piston, and the liquid is forced (when the instrument is actuated) from the compression chamber, in which it is subjected to pressure, by arranged pathways into the other compression chamber.

Difficulty is experienced in hydraulic shock absorbers in adjusting the resistances offered by or in the pathways, owing to the variation of viscosity of the liquid used, due to changes of temperature. The object of the invention is to overcome this difficulty and secure other advantages. The principle of this invention lies mainly in minimizing the effect of the variation of viscosity, and rendering it of comparatively little moment. To that end the conduits or passage ways from one compression chamber to the other are according to this of the most simple and direct nature and are controlled by spring loaded valves preferably of comparatively large area.

According to this invention the conduits or passage ways are constructed in the piston, and preferably the valve controlling the liquid-pathway from one chamber to the other are made concentric with the valve or valves controlling the liquid-pathway in the opposite direction. This concentric arrangement may be made by arranging one valve concentric with, or with its axis parallel to the axis of the piston, its spring reacting between the valve and the wall of the piston, and arranging the other valve concentric with and within the first mentioned valve.

In the accompanying drawings an example of my invention is illustrated.

Fig. 1 is a sectional elevation of the shock absorber, Fig. 2 a part sectional plan on the line 2—2 in Fig. 3, Fig. 3 an end sectional elevation on the line 3—3 in Fig. 1, Fig. 4 an end elevation of the piston and valve from the direction of the arrow marked 4 in Fig. 1, and Fig. 5 a section of the outer valve only (the inner valve being removed) on the line 5—5 on Fig. 1.

Fig. 6 is a vertical, longitudinal sectional view, on an enlarged scale, of the piston at one end thereof, showing the valve arrangement.

Fig. 7 is a horizontal sectional view, on an enlarged scale, of the piston and its associate valves.

Figure 1:
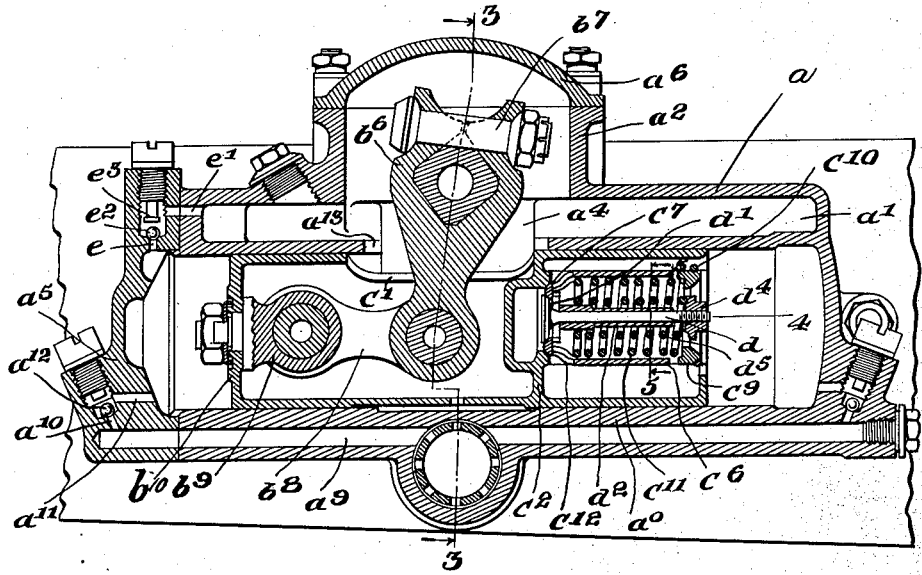
Figure 2:
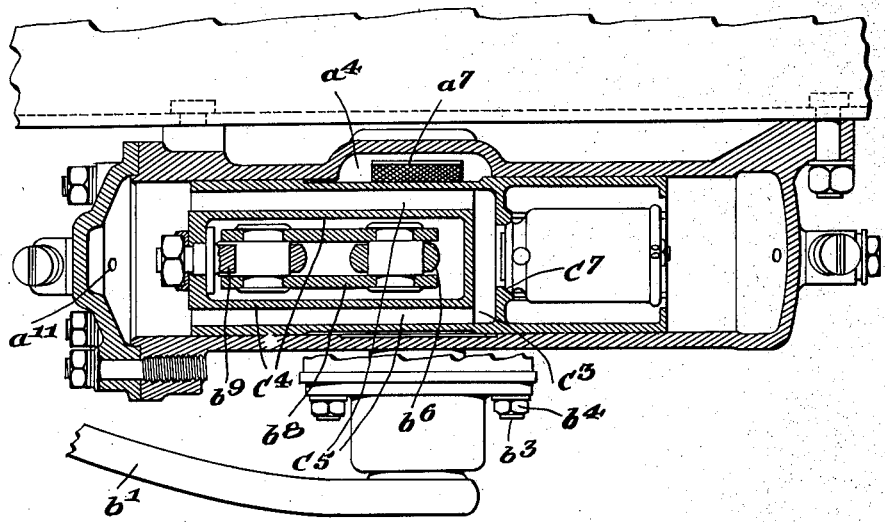

$a$ is the cylinder block comprising the cylinder $a^0$ in which the piston reciprocates, an elongated chamber $a^1$ above the cylinder and extending the whole length of the same, an elliptical upstanding part $a^2$, a projecting cylindrical part $a^3$, a reservoir $a^4$ which is connected with the space $a^1$ above the cylinder, extends down one side of the cylinder to the under part thereof, and there merges into a cylindrical projection (see Fig. 3). $a^5$ is an end cover to be affixed when the piston is in position, and $a^6$ is a cover to be affixed when the working parts are assembled, $a^7$ is a cylindrical plug closing the open end of the said cylindrical projection, $a^8$ is a gauze strainer soldered to the plug $a^7$, $a^9$ is a conduit drilled through the wall of the cylinder block and into the cover $a^5$, $a^{10}$ and $a^{11}$ are two conduits by which fluid can pass from the conduit $a^9$ into one of the compression chambers, controlled by a one-way ball valve $a^{12}$, there being similar conduits and a similar valve from the conduit $a^9$ to the other compression chamber. The cylindrical plug $a^7$, as illustrated in Figs. 1 and 3, is formed with three circumferential grooves with openings into the interior of the plug. Two of these grooves with their openings are covered with the gauze strainer through which direct communication is had with the reservoir $a^4$. The third groove and openings lead to the two halves of the conduit $a^9$, which lead to the drilled holes $a^{10}$ and $a^{11}$, controlled by the valves $a^{12}$, leading into either end of the cylinder. At the top of the cylinder there is an elliptical hole $a^{13}$ for the lever hereinafter referred to to pass through. $b$ is a shaft rotating in the cylindrical part $a^3$, operatively connected to the "shocked" member to be restrained by lever $b^1$ and secured in the cylindrical part. $b^2$ is a cap forming a housing for a packing gland secured by studs and nuts $b^3$ and $b^4$. The shaft $b$ has a square part $b^5$, $b^6$ is a bifurcated lever mounted on the square part of the shaft, and clamped thereto by means of a bolt $b^7$, passing through perforated bosses formed on the jaws of the lever, $b^8$ are links pivotally hinged to the said lever and to a lug $b^9$ bolted to the end of the piston $c$.

The piston $b^{10}$ is hollow, closed at one end, open at the other end, and formed with a gap $c^1$ for the lever $b^6$ to pass through. $c^2$ is a diaphragm across the piston $b^{10}$ shaped to form a rectangular horizontal chamber $c^3$ with a circular orifice normally closed by the hollow valve $c^6$ hereinafter described, $c^4$ are two elongated bosses extending from one end of the piston to the said diaphragm, $c^5$ are holes drilled down such bosses into the chamber $c^3$, so that the chamber $c^3$ is in free communication with the compression chamber at one end of the piston, $c^6$ is a hollow piston valve normally closed at one end, and permanently open at the other, seating on a conical surface $c^7$, formed on the circular orifice of the chamber, $c^3$, $c^8$ (see Figure 4) are radial webs extended from the interior of the piston forming guides for the hollow piston valve, $c^9$ is an annular shouldered member inserted in the circular space between the webs, and located by a split ring $c^{10}$ in gaps formed in each of the webs, $c^{11}$ is a coil spring reacting between the hollow valve and the shoulder of the member $c^9$. There are four holes $c^{12}$ in the wall of the hollow valve through which liquid can freely pass, $c^{13}$ is a hole through the bottom of the hollow piston to enable any oil which may collect there to pass out. $d$ is a mushroom valve seating on a conical opening $d^1$ in the normally closed end of the hollow valve, $d^2$ is a guide for the mushroom valve supported from the wall of the hollow valve by ribs $d^3$, $d^4$ is a nut engaging a thread on the end of the spindle of the mushroom valve, $d^5$ is a spiral spring reacting between the said nut, and the said ribs projected from the wall of the hollow valve. $e$ and $e^1$ are conduits for an air leak through which air can escape from one of the compression chambers into the space $a^1$, controlled by the one-way ball valve $e^2$. The cross section area through this air leak is predetermined and fixed by the flange $e^3$. In the apparatus illustrated the valves $c$ and $d$ are shown as concentric with one another, but with their axis above the axis of the piston. The object of placing the valves near the top of the piston is to facilitate the escape of air from that end of the piston remote from the air leak.

The functioning of the apparatus is as follows, the compression chambers being filled with liquid, and the reservoir supplied with a suitable quantity of like liquid. If the piston is moved to the right, liquid from the right compression chamber will be forced, always subject to resistance of the spring $d^5$, through the valve $d$ into the chamber $c^3$ and thence to the left compression chamber. If the piston is moved to the left, liquid from the left chamber will be forced, always resisted by the spring $c^{11}$, through the valve $c$, and thence through the holes $c^{12}$, and between the webs $c^8$ to the right compression chamber.

With apparatus as described apart from the valves, the liquid can pass freely from one compression chamber to the other and variation of viscosity due to change in temperature is negligible. The cross sectional areas of each of the valves, and the consequential allowed range of opening, are such that the valve opening accommodates itself to any such variations of viscosity of the liquid.

It is to be noticed that there is a difference between the effect of an upward and downward movement of the springs of a car and it has been determined by experiment that, while in both movements a damping is desirable, the car will ride more smoothly if the axle be allowed to approach the frame more easily than to move away from it. Hence, it is desirable that the valves shall be spring loaded with springs offering different resistance.

What I claim is:—

1. A hydraulic shock absorber of the type comprising a closed cylinder, a double-ended piston within such cylinder, a compression chamber on each side of the piston, restricted means of communication consisting of pathways and orifices from one chamber to the other, and means whereby the piston is moved to and fro by the "shocked" member to be restrained, characterized in that the piston is hollow, and further comprises a diaphragm with the central orifice extending across the piston, means including pathways in the body of the piston whereby each compression chamber is in free communication with the space on its side of the diaphragm immediately adjoining the diaphragm, a moving tubular member normally closed at one end and permanently open at the other, seating at its normally closed end on the orifice in the diaphragm, radial ribs projecting inwardly from the piston wall extending from the diaphragm for a suitable distance in the direction of, and constituting axial guides for, the tubular member, notches in the inner edges of the said ribs beyond the range of movement of the tubular member forming an annular recess, a split ring in such notches, a flat annular member in the circular space within the ribs abutting against the split ring, a coil spring reacting between the said annular member and the tubular member urging the tubular member to close the said orifice, a central hole in the normally closed end of the tubular member, a sleeve guide within the tubular member co-axial with, but spaced away from the said hole, and supported at its end nearer to the said hole by ribs extended from the wall of the tubular member, a mushroom member seating on the outer side of the said hole and the stem thereof projecting through the hole and through and for a distance beyond the sleeve guide, a thread on the end of the said stem, a nut screwed on the said thread and a coil spring reacting between the nut, and the said ribs urging the mushroom member to close the said hole.

2. A hydraulic shock absorber of the type in which the damping takes place in any movement of the piston and the oil displaced passes directly to and fro between the compression chambers comprising a closed cylinder, a double-ended piston within such cylinder, a compression chamber on each side of the piston, restricted means of communication consisting of pathways and orifices from one chamber to the other and means whereby the piston is moved to and fro by the "shocked" member to be restrained, characterized in that the means of communication is through the body of the piston, two spring loaded valves of which one opens under pressure in one direction and the other under pressure in the other direction, and each offers a predetermined resistance, normally to close the means of communication, and means for replenishing the compression chambers including a reservoir of liquid, a conduit leading from such reservoir to one of the compression chambers, a one-way valve controlling such conduit, another conduit leading from the reservoir to the other compression chamber, a one-way valve controlling such last mentioned conduit, and an air leak from the top of one of the compression chambers to the reservoir.

In witness whereof I have signed this specification.

FREDERICK HENRY ROYCE.